Patented Dec. 16, 1952

2,622,106

UNITED STATES PATENT OFFICE 2,622,106

1,1,2-TRICHLORO-1-FLUOROETHANE

William A. Stover, Woodbury, N. J., assignor to Socony-Vacuum Oil Company, Incorporated, a corporation of New York No Drawing. Application December 22, 1948, Serial No. 66,851

1 Claim. (Cl. 260—653)

This invention relates to the production of monofluorochloroalkanes from chloroalkenes and to new compositions of matter produced thereby. It is more specifically concerned with the production of 1,1,2-trichloro-1-fluoroethane from trichloroethylene.

The reaction of hydrogen fluoride with chloro-olefins is not new. As reported by Henne and Whaley, J. A. C. S. 64, 1157 (1942), Henne and Haeckel, J. A. C. S. 63, 2692 (1941), Henne and Renolt, J. A. C. S. 59, 2434 (1937) and Henne and Hinkamp, J. A. C. S. 67, 1194, 1197 (1945), the following typical reactions have been studied:

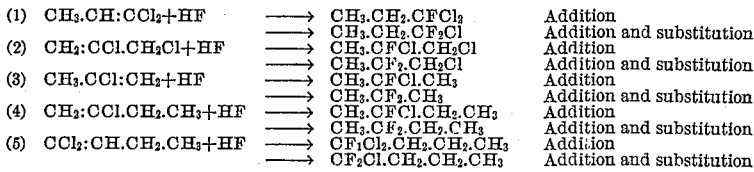

Most of these reactions were carried out in the presence of an excess of hydrogen fluoride in the temperature range varying between 20° C. and 100° C.

According to these authors, these reactions, in all cases, produced mixtures of the indicated products. Apparently, no attempt was made to influence the course of the reactions so as to produce either one or the other of the indicated products, exclusively, or in a large preponderance.

United States Letters Patent No. 2,399,024 to Jesse Harmon also describes the reaction of hydrogen fluoride with a chloro-olefin, trichloroethylene, and the production of a certain amount of 1,2-dichloro-1,1-difluoroethane as a result.

A paper presented before the Organic Section of the American Chemical Society at Atlantic City, April 9, 1946, by McBee, Hass, Bittenbender, Weesner, Toland and Hausch, and entitled "Fluorinated Derivatives of Ethane," also describes the reaction of hydrogen fluoride with certain choloro-olefins and the production of di- and tri-fluoroalkanes as a result.

In so far as can be determined, no attempt has heretofore been made to efficiently produce monofluorochloroalkanes from chloro-olefins by direct treatment of the chloro-olefins with hydrogen fluoride. Such a method of producing monofluorochloroalkanes is obviously advantageous, since it avoids the necessity of using expensive fluorinating catalysts, such as the antimony fluorides and the mercury fluorides.

In accordance with the present invention, it has now been discovered that monofluorochloroalkanes can be produced as the predominant product by a method which is efficient and economical. It has now been found that by properly controlling the reaction conditions, hydrogen fluoride can be reacted with chloro-olefins to produce good yields of monofluorochloroalkanes.

Accordingly, it is an object of the present invention to provide a process for the production of monofluorochloroalkanes which is efficient and economical. Another object is to provide new compositions of matter. A specific object is to provide 1,1,2-trichloro-1-fluoroethane by a process wherein it is the predominant product.

Other objects and advantages of the present invention will become apparent to those skilled in the art from the following detailed description.

Broadly stated, the present invention provides a process for the production of monofluorochloroalkanes having at least one chlorine atom attached to the same carbon atom to which the fluorine atom is attached, which comprises contacting a chloro-olefin having at least one double bond and at least one chlorine atom attached to a carbon atom which forms part of an unsaturated carbon-carbon linkage, with hydrogen fluoride, in a reaction zone, in a molar ratio of hydrogen fluoride to chloro-olefin of less than about 13:1 and, preferably, between about 7:1 and about 1:1, at a pressure of at least 2200 pounds per square inch, for a period of time of less than about ten hours, and, preferably, less than about five hours, and at temperatures varying between about 175° C. and about 325° C.; and, as new compositions of matter, the 1,1,2-trichloro-1-fluoroalkanes produced thereby.

The chloro-olefin reactants utilizable in the present process are those having at least one double bond and at least one chlorine atom attached to a carbon atom which forms part of an unsaturated carbon-carbon linkage. In this connection, any polychlorinated olefin which has chlorine atoms substituted at random throughout the molecule may be used provided that at least one chlorine atom is attached to a carbon atom which forms part of an unsaturated carbon-carbon linkage. Although any such olefin may be used, it is preferred to use chloro-olefins containing up to about sixteen carbon atoms per molecule. Bromine or iodine atoms may be substituted in place of the chlorine atoms, but the chloro-olefins are especially preferred. Non-limiting examples of the chloro-olefin reactant are vinyl chloride; 1,1-dichloroethene; 1,2-dichloroethene; 1,1,2-trichloroethene; 1,1,2,2-tetrachloroethene; 1-chloropropene-1; 2-chloropropene-1; 1,1-dichloropropene-1; 1,2-dichloropropene-1; 2,3-dichloropropene-1; 1,3-dichloropropene-1; chloroprene; 2,3-dichlorobutadiene-1,3; 2-chloropentadiene-1,3; 2-chloropentadiene-1,4; 2,4 - dichloropentadiene - 1,3; isocrotyl chloride; 1,2-dichlorooctene-1; dichloroconylene; 2-methyl-6-methylene - 7 - chlorooctadiene-2,7; 1,2-dichlorodecene-1; 2-chlorodecene-1; 2-chlorotetradecene-1; 2-chlorohexadecene-1; 1,2-dichlorohexadecene - 1; and 9,10 - dichlorooctadecene-1. Mixtures of chloro-olefins and mixtures of chloro-olefins with hydrocarbons or other non-interfering compounds may also be used.

As has been stated hereinbefore, it is essential, in the present process, to employ reaction conditions that vary within somewhat narrow limits. The reaction conditions which must be carefully controlled in order to achieve good yields of monofluorochloroalkanes by the direct reaction of hydrogen fluoride with chloro-olefins are (1) pressure, (2) proportions of reactants, and (3) reaction time. These three conditions appear to rank in importance in the order in which they have been named. For example, hydrogen fluoride and trichloroethylene may be reacted, in a molar ratio of about 7:1, respectively, at 210° C., at which temperature a minimum of 800 pounds per square inch of pressure is necessary to maintain the reactants in liquid form. However, at 800 pounds per square inch, the yield of monofluorotrichloroethane is insignificant, most of the trichloroethylene being converted into dichlorodifluoroethane. As the pressure is raised, more of the trichloroethylene is converted into the monofluoro derivative and less into the difluoro derivative. At pressure in excess of 2200 pounds per square inch relatively good yields of the monofluoro derivative are obtained; and, at pressures in excess of 3200 pounds per square inch, for example, a pressure of 4400 pounds per square inch, the yield of the monofluoro derivative is much greater than the yield of the difluoro derivative. Accordingly, pressures in excess of about 2200 pounds per square inch must be used. Pressures in excess of about 2800 pounds per square inch are preferred, in order to obtain a maximum yield of monofluorochloroalkane, particularly when the contact time is relatively low. In practice, pressures generally will not exceed about 5500 pounds per square inch, but it will be obvious that the process will be operable at pressures higher than about 5500 pounds per square inch.

In the present process, it has been found that polyfluorochloroalkanes will be produced to the exclusion of monofluorochloroalkanes if the contact time is extended to six hours or more, unless the pressure is relatively low. Good yields of monofluoroalkanes are obtained, however, even at relatively high pressures when the contact time is about five hours or less. It has also been found that when operating at lower pressures, i. e., at about 2200 pounds per square inch, a maximum contact time of about ten hours is permissible. When a contact time of more than ten hours is used, the reaction proceeds almost exclusively to the production of polyfluorochloroalkanes, regardless of the lowered pressure. Accordingly, the contact time must be less than about ten hours and, preferably, it is less than about five hours. The present process will be operable at very short contact times when the other factors are varied properly. However, a contact time much less than about 30 minutes is not preferred, for practical reasons.

Similarly, the proportions of hydrogen fluoride and chloro-olefin effect the course of the reaction. When the hydrogen fluoride is present in considerable excess, for example, 2 parts by weight of hydrogen fluoride per part by weight of trichloroethylene, unless the pressure is extremely high and the contact time is relatively low, the yield of the monofluoro derivative is relatively low. As the proportion of hydrogen fluoride is lowered, for example to a 1:1 ratio by weight, the yields of the monofluoro derivative, at pressures of 2200 pounds per square inch and higher, increase materially. If the proportion of hydrogen fluoride is even further reduced, for example to a 1/2:1 ratio by weight, the yield of the monofluoro derivative still further increases. Accordingly, it has been found that a weight ratio of hydrogen fluoride to trichloroethylene of 1.5:1 or less is necessary for the production of the monofluorochloroalkane product. The preferred weight ratio is about 1:1. In terms of molar proportions, since trichloroethylene has a molecular weight of about 131 and hydrogen fluoride has a molecular weight of about 20, the above means that a molar ratio of hydrogen fluoride to chloro-olefin reactant of about 13:1 is the upper limit of practicability, and that a molar ratio of about 7:1 or less is preferable. The lower limit of practicable molar ratios is difficult to fix, but generally it may be stated that ratios below 1:1 are impractical. This corresponds to a lower limit in terms of weight ratio of about 0.15:1. With respect to the applicability of the present process to chloro-olefins other than trichloroethylene, it has been found that the proportions of reactants are best expressed in terms of molar ratio, rather than weight ratio. In accordance with the foregoing, the molar ratio of hydrogen fluoride to chloro-olefin reactant will vary between about 13:1 and about 1:1, and, preferably, between about 7:1 and about 1:1.

It is to be noted that there is a definite relationship among the three reaction conditions discussed hereinbefore. Failure to control one of the reaction conditions will result in little or no yield of monofluorochloroalkane product, even if the other two factors be properly controlled. In general, the relationship among these reaction conditions is as follows: (1) When operating for relatively short contact times, the ratio of reactants and the pressure must be relatively high, i. e., in the upper portion of the ranges of variation for these factors. (2) When operating for relatively long contact times, i. e., approaching about ten hours, the ratio of reactants and the pressure must be relatively low. Substantial variation from these limits of variation will generally result in failure to produce the monofluorochloroalkane product, and in almost exclusive production of the polyfluorochloroalkane products.

The temperature of the reaction is not too critical a factor. The success of the present process depends, in the main, on the control of the other reaction conditions as set forth hereinbefore. In general, temperatures below about 175° C. tend to prevent the formation of monofluoro derivatives. Accordingly, temperatures varying between about 200° C. and about 325° C. are satisfactory.

The process may be conducted either batchwise or continuously in suitable equipment, many types of which are well-known to those familiar with the art. Unreacted chloro-olefins and hydrogen fluoride may be recovered and recycled and by-products may be separated from the desired monofluoro derivatives by distillation, or by other well-known means.

The following examples will illustrate the details and advantages of the process of this invention. In these examples weighed proportions of trichloroethylene and hydrogen fluoride were charged to a high-pressure, rocker bomb which had previously been evacuated. The bomb was heated as rapidly as possible to reaction temperature, maintained there for a specified time, and then allowed to cool. The reactants, upon being released from the bomb through a needle valve, passed through a copper tube into a steel beaker containing ice in ice water. The crude product was water washed, filtered and distilled in a column of ten theoretical plates at a 10:1 reflux ratio. This was a laboratory arrangement and the yields were, therefore, not as good as may be expected from a more carefully designed commercial installation.

EXAMPLE 1

Trichloroethylene and hydrogen fluoride, in the ratio of 505 grams of trichloroethylene to 510 grams of hydrogen fluoride were charged to a high pressure bomb. The bomb and its contents were rocked, heated rapidly to 215° C. and maintained at that temperature for 8 hours. During this time the pressure was maintained between 2500 and 2800 pounds per square inch. The product and excess hydrogen fluoride were bled through a needle valve into a mixture of ice and ice water. After washing and drying, 475 grams of material remained. This material was subjected to analytical distillation as described above. Of the charged material, 39% boiling between 45 and 65° C., indicating that it was 1,2-dichloro-1,1-difluoroethane, and 50% boiled between 65 and 85° C., indicating that it was the desired 1,1,2-trichloro-1-fluoroethane.

Analysis of the fraction boiling between 65 and 85° C. showed it to contain 65% chlorine and 12% fluorine. The calculated percentages of chlorine and fluorine in 1,1,2-trichloro-1-fluoroethane are 63.6% and 12.5%, respectively.

EXAMPLES 2, 3, 4, 5 AND 6

*Effect of pressure*

A series of runs similar to the run set forth in Example 1 was made. In this series of runs, pressure was varied in conjunction with the contact time and the ratio of the reactants. Pertinent data for these runs are set forth in Table I.

TABLE I.—EFFECT OF PRESSURE

| Run | Charge, grams | | Pressure, p. s. i. | Molar ratio, HF/Cl$_2$C:CHCl | Contact time, hours | Temp., °C. | Product Analysis | |
|---|---|---|---|---|---|---|---|---|
| | HF | Cl$_2$C:CHCl | | | | | Volume percent CF$_2$ClCH$_2$Cl | Volume percent CFCl$_2$CH$_2$Cl |
| 2 | 575 | 320 | 2,300 | 3.7:1 | 10 | 215 | 18.2 | 10.3 |
| 3 | 505 | 510 | 2,800 | 6.7:1 | 8 | 215 | 39.0 | 50.0 |
| 4 | 248 | 390 | 2,200 | 10.3:1 | 10.3 | 214 | 32.6 | 0 |
| 5 | 226 | 435 | 2,050 | 12.6:1 | 1.9 | 215 | 10.9 | 2.6 |
| 6 | 347 | 710 | 4,650 | 13.1:1 | 2.1 | 216 | 34.0 | 40.2 |

It will be apparent from Table I that pressure, as stated hereinbefore, is one of the important factors in the reaction involved herein. When operating for periods of time near the upper limit of the contact time range and when using a low ratio of reactants, relatively low pressures are required to give good yields of the monofluorochloroalkane. However, when the ratio is increased, the desired product is not obtained at low pressures. When operating for relatively short periods of time and at higher ratios, the pressure requirement changes. A relatively low pressure produces a small amount of the desired product, but its yield is increased appreciably when a higher pressure is used.

EXAMPLES 7, 8, 9, 10 AND 11

*Effect of the ratio of reactants*

Another series of runs was made as in the preceding series, but in this series, the molar ratio of the reactants was varied in relation to the contact time and the pressure. The results and pertinent data for these runs are tabulated in Table II.

TABLE II—EFFECT OF RATIO OF REACTANTS

| Run | Charge, grams | | Molar ratio, HF/ClC:CHCl | Pressure, p. s. i. | Contact time, hours | Temp., °C. | Product analysis | |
|---|---|---|---|---|---|---|---|---|
| | HF | Cl$_2$C:CHCl | | | | | Volume percent CF$_2$ClCH$_2$Cl | Volume percent CFCl$_2$CH$_2$Cl |
| 7 | 575 | 320 | 3.7:1 | 2,300 | 10 | 215 | 18.2 | 10.3 |
| 8 | 505 | 510 | 6.7:1 | 2,800 | 8 | 215 | 39.0 | 50.0 |
| 9 | 226 | 435 | 12.6:1 | 2,050 | 1.9 | 215 | 10.9 | 2.6 |
| 10 | 347 | 710 | 13.1:1 | 4,650 | 2.1 | 216 | 34.0 | 40.2 |
| 11 | 100 | 240 | 15.7:1 | 3,750 | 1.5 | 288 | 59.3 | 0 |

It will be apparent from the data set forth in Table II that the ratio of reactants is interrelated with the other reaction variables of the reaction. It will be noted that at the lower molar ratios, low pressures and longer reaction periods produce good yields of monofluorochloroalkanes. However, as the ratio is increased to the preferred maximum, the yield falls off to zero. When higher ratios of reactants and relatively short contact times are employed, little of the desired product is obtained at relatively low pressures. Again, at higher pressures, the yields of monofluoro-derivative become satisfactory, but when the ratio of reactants exceeds the limit of about 13:1, the yield falls off to zero even at relatively high pressures.

The effect of contact time is illustrated by the runs tabulated in Table III.

TABLE III—EFFECT OF REACTION TIME

| Run | Charge, grams | | Contact time, hours | Pressure, p. s. i. | Molar ratio $HF/Cl_2C:CHCl$ | Temp., °C. | Product analysis | |
|---|---|---|---|---|---|---|---|---|
| | HF | $Cl_2C:CHCl$ | | | | | Volume percent $CF_2ClCH_2Cl$ | Volume percent $CFCl_2CH_2Cl$ |
| 5 | 226 | 435 | 1.9 | 2,050 | 12.6:1 | 215 | 10.9 | 2.6 |
| 6 | 347 | 710 | 2.1 | 4,650 | 13.1:1 | 216 | 34.0 | 40.2 |
| 7 | 222 | 430 | 5.6 | 2,400 | 12.7:1 | 218 | 34.0 | 0 |
| 4 | 248 | 390 | 10.3 | 2,200 | 10.3:1 | 214 | 32.6 | 0 |
| 3 | 505 | 510 | 8 | 2,300 | 6.7:1 | 215 | 39.0 | 50.0 |
| 2 | 575 | 320 | 10 | 2,800 | 3.7:1 | 215 | 18.2 | 10.3 |

As shown in Table III, in operations in which relatively short contact times are used, a combination of relatively high ratio and pressure give the best results. As the contact time is increased, the ratio as well as the pressure must be decreased otherwise, the desired monofluoro product is not obtained. When the contact time is increased to the maximum, a combination of low ratios of reactants and relatively low pressures produce good results.

EXAMPLES 12, 13, 14, 15, 16, 17 AND 18

*Effect of reaction temperature*

A series of runs similar to the run set forth in Example 1 was made. In this series or runs, temperature was varied in conjunction with contact time, ratio of reactants and pressure. The pertinent data are set forth in Table IV.

TABLE IV—EFFECT OF REACTION TEMPERATURE

| Run | Charge, grams | | Temp., °C. | Pressure, p. s. i. | Molar ratio $HF/Cl_2C:CH_2Cl$ | Contact time, hours | Product analysis | |
|---|---|---|---|---|---|---|---|---|
| | HF | $Cl_2C:CHCl$ | | | | | Volume percent $CF_2ClCH_2Cl$ | Volume percent $CFCl_2CH_2Cl$ |
| 12 | 575 | 320 | 215 | 2,300 | 3.7:1 | 10 | 18.2 | 10.3 |
| 13 | 505 | 510 | 215 | 2,800 | 6.7:1 | 8 | 39.0 | 50.0 |
| 14 | 248 | 390 | 214 | 2,200 | 10.3:1 | 10.3 | 32.6 | 0 |
| 15 | 100 | 200 | 271 | 2,800 | 13.1:1 | 1.6 | 28.4 | 0 |
| 16 | 98 | 200 | 299 | 3,750 | 13.1:1 | 1.6 | 20.6 | 41.5 |
| 17 | 347 | 710 | 216 | 4,650 | 13.1:1 | 2.1 | 34.0 | 40.2 |
| 18 | 100 | 240 | 288 | 3,750 | 15.7:1 | 1.5 | 59.3 | 0 |

It will be apparent from these data that the reaction temperature is not too critical a factor. Good yields of monofluorochloroalkanes are obtained when relatively low ratios and pressures and relatively long contact times are employed. When, for example, the ratio is increased, an increase in temperature will not remedy the disadvantageous effects, and no desired product will be obtained. When the pressure is too low, in relation to the ratio and contact time, an increase in temperature again does not remedy the disadvantageous effects. Finally, when the ratio is increased, the use of high temperatures does not overcome the undesirable effect created by this change. On the other hand, when relatively high pressures and ratios, and relatively short contact times are used, good yields of desired product can be attained, whether the temperature is high or low.

The monofluorochloroalkanes produced by the process of the present invention are useful as intermediates for preparing a large number of fluorine-containing compounds. For example, they can be dehydrochlorinated to produce olefinic fluorides which can, in turn, be converted to resins by polymerization. Also, in compounds wherein there are two chlorine atoms, one on each of two adjacent carbon atoms, the chlorine atoms can be removed by treatment with zinc in alcohol to produce olefinic fluorides. This type of reaction is utilizable using the new compounds contemplated herein, namely, the 1,1,2-trichloro-1-fluoroalkanes.

Although the present invention has been described in conjunction with preferred embodiments, it is to be understood that modifications and variations may be resorted to without departing from the spirit and scope of this invention, as those skilled in the art will readily understand. Such variations and modifications are considered to be within the scope and purview of the appended claim.

What is claimed is:

A process for the production of 1,1,2-trichloro-1-fluoroethane, which comprises contacting hydrogen fluoride with 1,1,2-trichloroethene-1, in a molar ratio of hydrogen fluoride to said 1,1,2-trichloroethene-1 varying between about 1:1 and about 13:1, at pressures of at least about 2800 pounds per square inch, for a period of time of less than about five hours, and at temperatures varying between about 200° C. and about 300° C.

WILLIAM A. STOVER.

REFERENCES CITED

The following references are of record in the file of this patent:

UNITED STATES PATENTS

| Number | Name | Date |
|---|---|---|
| 2,399,024 | Harmon | Apr. 23, 1946 |

OTHER REFERENCES

Henne et al., "Jour. Am. Chem. Soc.," vol. 58, pp. 404–6 (1936).

Grosse et al., "Jour. Org. Chem.," vol. 3, pp. 26–32 (1938).

Henne et al., Ibid., vol. 70, pp. 758–60 (1948).